(12) United States Patent  
Moskowitz

(10) Patent No.: US 9,191,205 B2  
(45) Date of Patent: Nov. 17, 2015

(54) MULTIPLE TRANSFORM UTILIZATION AND APPLICATION FOR SECURE DIGITAL WATERMARKING

(71) Applicant: Scott A. Moskowitz, Ft. Lauderdale, FL (US)

(72) Inventor: Scott A. Moskowitz, Ft. Lauderdale, FL (US)

(73) Assignee: Wistaria Trading Ltd, Hamilton (BM)

( * ) Notice: Subject to any disclaimer, the term of this patent is extended or adjusted under 35 U.S.C. 154(b) by 0 days.

(21) Appl. No.: 14/258,118

(22) Filed: Apr. 22, 2014

(65) Prior Publication Data

US 2014/0226812 A1     Aug. 14, 2014

Related U.S. Application Data

(60) Continuation of application No. 13/937,106, filed on Jul. 8, 2013, which is a continuation of application No. 12/799,894, filed on May 4, 2010, now Pat. No. 8,542,831, which is a continuation of application No.

(Continued)

(51) Int. Cl.
*H04L 29/06* (2006.01)
*H04L 9/14* (2006.01)
(Continued)

(52) U.S. Cl.
CPC . *H04L 9/14* (2013.01); *G06T 1/005* (2013.01); *G06T 1/0028* (2013.01); *G06T 1/0057* (2013.01); *G06T 1/0064* (2013.01);
(Continued)

(58) Field of Classification Search
CPC ... H04L 9/14; H04L 9/0819; H04L 2209/043; H04L 2209/04; H04L 2209/046; G06T 1/0057; G06T 1/005; G06T 1/0028; G06T 1/0064; G06T 2201/0063; H04N 1/32187; H04N 1/32309; H04N 1/3216
USPC .......................................... 380/203, 252, 264
See application file for complete search history.

(56) References Cited

U.S. PATENT DOCUMENTS 3,947,825 A     3/1976   Cassada
3,984,624 A     10/1976  Waggener (Continued)

FOREIGN PATENT DOCUMENTS

EP          0372601        6/1990
EP          0565947        10/1993

(Continued)

OTHER PUBLICATIONS

EPO Application No. 96919405.9, entitled "Steganographic Method and Device"; published as EP0872073 (A2), Oct. 21, 1998.

(Continued)

*Primary Examiner* — Yin-Chen Shaw
*Assistant Examiner* — John B King
(74) *Attorney, Agent, or Firm* — Neifeld IP Law, PC

(57) ABSTRACT

Multiple transform utilization and applications for secure digital watermarking In one embodiment of the present invention, digital blocks in digital information to be protected are transformed into the frequency domain using a fast Fourier transform. A plurality of frequencies and associated amplitudes are identified for each of the transformed digital blocks and a subset of the identified amplitudes is selected for each of the digital blocks using a primary mask from a key. Message information is selected from a message using a transformation table generated with a convolution mask. The chosen message information is encoded into each of the transformed digital blocks by altering the selected amplitudes based on the selected message information.

16 Claims, 3 Drawing Sheets

Related U.S. Application Data

11/358,874, filed on Feb. 21, 2006, now Pat. No. 7,738,659, which is a division of application No. 09/644,098, filed on Aug. 23, 2000, now Pat. No. 7,035,409, which is a division of application No. 09/053,628, filed on Apr. 2, 1998, now Pat. No. 6,205,249.

(51) Int. Cl.
 *G06T 1/00* (2006.01)
 *H04N 1/32* (2006.01)
 *H04L 9/08* (2006.01)

(52) U.S. Cl.
 CPC ............ *H04L9/0819* (2013.01); *H04N 1/3216* (2013.01); *H04N 1/32187* (2013.01); *H04N 1/32309* (2013.01); *G06T 2201/0051* (2013.01); *G06T 2201/0052* (2013.01); *G06T 2201/0053* (2013.01); *G06T 2201/0061* (2013.01); *G06T 2201/0063* (2013.01); *G06T 2201/0065* (2013.01); *G06T 2201/0083* (2013.01); *H04L 2209/04* (2013.01); *H04L 2209/043* (2013.01); *H04L 2209/046* (2013.01); *H04N 2201/324* (2013.01); *H04N 2201/3233* (2013.01)

(56) References Cited

U.S. PATENT DOCUMENTS

| | | | |
|---|---|---|---|
| 3,986,624 | A | 10/1976 | Cates, Jr. et al. |
| 4,038,596 | A | 7/1977 | Lee |
| 4,200,770 | A | 4/1980 | Hellman et al. |
| 4,218,582 | A | 8/1980 | Hellman et al. |
| 4,339,134 | A | 7/1982 | Macheel |
| 4,390,898 | A | 6/1983 | Bond et al. |
| 4,405,829 | A | 9/1983 | Rivest et al. |
| 4,424,414 | A | 1/1984 | Hellman et al. |
| 4,528,588 | A | 7/1985 | Lofberg |
| 4,633,462 | A | 12/1986 | Stifle |
| 4,672,605 | A | 6/1987 | Hustig et al. |
| 4,748,668 | A | 5/1988 | Shamir et al. |
| 4,789,928 | A | 12/1988 | Fujisaki |
| 4,827,508 | A | 5/1989 | Shear |
| 4,876,617 | A | 10/1989 | Best et al. |
| 4,896,275 | A | 1/1990 | Jackson |
| 4,908,873 | A | 3/1990 | Philibert et al. |
| 4,939,515 | A | 7/1990 | Adelson |
| 4,969,204 | A | 11/1990 | Melnychuk et al. |
| 4,972,471 | A | 11/1990 | Gross et al. |
| 4,977,594 | A | 12/1990 | Shear |
| 4,979,210 | A | 12/1990 | Nagata et al. |
| 4,980,782 | A | 12/1990 | Ginkel |
| 5,050,213 | A | 9/1991 | Shear |
| 5,073,925 | A | 12/1991 | Nagata et al. |
| 5,077,665 | A | 12/1991 | Silverman et al. |
| 5,103,461 | A | 4/1992 | Tymes |
| 5,111,530 | A | 5/1992 | Kutaragi |
| 5,113,437 | A | 5/1992 | Best et al. |
| 5,123,045 | A | 6/1992 | Ostrovsky |
| 5,136,581 | A | 8/1992 | Muehrcke |
| 5,136,646 | A | 8/1992 | Haber et al. |
| 5,136,647 | A | 8/1992 | Haber et al. |
| 5,142,576 | A | 8/1992 | Nadan |
| 5,161,210 | A | 11/1992 | Druyvesteyn et al. |
| 5,189,411 | A | 2/1993 | Collar |
| 5,210,820 | A | 5/1993 | Kenyon |
| 5,243,423 | A | 9/1993 | DeJean et al. |
| 5,243,515 | A | 9/1993 | Lee |
| 5,287,407 | A | 2/1994 | Holmes |
| 5,293,633 | A | 3/1994 | Robbins |
| 5,297,032 | A | 3/1994 | Trojan |
| 5,319,735 | A | 6/1994 | Preuss et al. |
| 5,327,520 | A | 7/1994 | Chen |
| 5,341,429 | A | 8/1994 | Stringer et al. |
| 5,341,477 | A | 8/1994 | Pitkin et al. |
| 5,363,448 | A | 11/1994 | Koopman et al. |
| 5,365,586 | A | 11/1994 | Indeck et al. |
| 5,369,707 | A | 11/1994 | Follendore, III |
| 5,375,055 | A | 12/1994 | Togher |
| 5,379,345 | A | 1/1995 | Greenberg |
| 5,394,324 | A | 2/1995 | Clearwater |
| 5,398,285 | A | 3/1995 | Borgelt et al. |
| 5,406,627 | A | 4/1995 | Thompson et al. |
| 5,408,505 | A | 4/1995 | Indeck et al. |
| 5,410,598 | A | 4/1995 | Shear |
| 5,412,718 | A | 5/1995 | Narasimhalv et al. |
| 5,418,713 | A | 5/1995 | Allen |
| 5,428,606 | A | 6/1995 | Moskowitz |
| 5,437,050 | A | 7/1995 | Lamb |
| 5,450,490 | A | 9/1995 | Jensen et al. |
| 5,469,536 | A | 11/1995 | Blank |
| 5,471,533 | A | 11/1995 | Wang et al. |
| 5,478,990 | A | 12/1995 | Montanari et al. |
| 5,479,210 | A | 12/1995 | Cawley et al. |
| 5,487,168 | A | 1/1996 | Geiner et al. |
| 5,493,677 | A | 2/1996 | Balogh et al. |
| 5,497,419 | A | 3/1996 | Hill |
| 5,506,795 | A | 4/1996 | Yamakawa |
| 5,513,126 | A | 4/1996 | Harkins et al. |
| 5,513,261 | A | 4/1996 | Maher |
| 5,530,739 | A | 6/1996 | Okada |
| 5,530,751 | A | 6/1996 | Morris |
| 5,530,759 | A | 6/1996 | Braudaway et al. |
| 5,539,735 | A | 7/1996 | Moskowitz |
| 5,548,579 | A | 8/1996 | Lebrun et al. |
| 5,568,570 | A | 10/1996 | Rabbani |
| 5,579,124 | A | 11/1996 | Aijala et al. |
| 5,581,703 | A | 12/1996 | Baugher et al. |
| 5,583,488 | A | 12/1996 | Sala et al. |
| 5,598,470 | A | 1/1997 | Cooper et al. |
| 5,606,609 | A | 2/1997 | Houser et al. |
| 5,613,004 | A | 3/1997 | Cooperman et al. |
| 5,617,119 | A | 4/1997 | Briggs et al. |
| 5,617,506 | A | 4/1997 | Burk |
| 5,625,690 | A | 4/1997 | Michel et al. |
| 5,629,980 | A | 5/1997 | Stefik et al. |
| 5,633,932 | A | 5/1997 | Davis et al. |
| 5,634,040 | A | 5/1997 | Her et al. |
| 5,636,276 | A | 6/1997 | Brugger |
| 5,636,292 | A | 6/1997 | Rhoads |
| 5,640,569 | A | 6/1997 | Miller et al. |
| 5,644,727 | A | 7/1997 | Atkins |
| 5,646,997 | A | 7/1997 | Barton |
| 5,649,284 | A | 7/1997 | Yoshinobu |
| 5,657,461 | A | 8/1997 | Harkins et al. |
| 5,659,726 | A | 8/1997 | Sandford, II et al. |
| 5,664,018 | A | 9/1997 | Leighton |
| 5,673,316 | A | 9/1997 | Auerbach et al. |
| 5,675,653 | A | 10/1997 | Nelson |
| 5,677,952 | A | 10/1997 | Blakely et al. |
| 5,680,462 | A | 10/1997 | Miller et al. |
| 5,687,236 | A | 11/1997 | Moskowitz et al. |
| 5,689,587 | A | 11/1997 | Bender et al. |
| 5,696,828 | A | 12/1997 | Koopman, Jr. |
| 5,719,937 | A | 2/1998 | Warren et al. |
| 5,721,781 | A | 2/1998 | Deo |
| 5,721,788 | A | 2/1998 | Powell et al. |
| 5,734,752 | A | 3/1998 | Knox |
| 5,737,416 | A | 4/1998 | Cooper et al. |
| 5,737,733 | A | 4/1998 | Eller |
| 5,740,244 | A | 4/1998 | Indeck et al. |
| 5,745,569 | A | 4/1998 | Moskowitz et al. |
| 5,748,783 | A | 5/1998 | Rhoads |
| 5,751,811 | A | 5/1998 | Magnotti et al. |
| 5,754,697 | A | 5/1998 | Fu et al. |
| 5,754,938 | A | 5/1998 | Herz |
| 5,757,923 | A | 5/1998 | Koopman, Jr. |
| 5,765,152 | A | 6/1998 | Erickson |
| 5,768,396 | A | 6/1998 | Sone |
| 5,774,452 | A | 6/1998 | Wolosewicz |
| 5,781,184 | A | 7/1998 | Wasserman |
| 5,790,677 | A | 8/1998 | Fox et al. |
| 5,799,083 | A | 8/1998 | Brothers et al. |
| 5,809,139 | A | 9/1998 | Grirod et al. |
| 5,809,160 | A | 9/1998 | Powell et al. |

(56) References Cited

U.S. PATENT DOCUMENTS

| | | |
|---|---|---|
| 5,818,818 A | 10/1998 | Soumiya |
| 5,822,432 A | 10/1998 | Moskowitz et al. |
| 5,822,436 A | 10/1998 | Rhoads |
| 5,828,325 A | 10/1998 | Wolosewicz et al. |
| 5,832,119 A | 11/1998 | Rhoads |
| 5,839,100 A | 11/1998 | Wegener |
| 5,842,213 A | 11/1998 | Odom |
| 5,845,266 A | 12/1998 | Lupien |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,864,827 A | 1/1999 | Wilson |
| 5,870,474 A | 2/1999 | Wasilewski et al. |
| 5,875,437 A | 2/1999 | Atkins |
| 5,884,033 A | 3/1999 | Duvall et al. |
| 5,889,868 A | 3/1999 | Moskowitz et al. |
| 5,892,900 A | 4/1999 | Ginter |
| 5,893,067 A | 4/1999 | Bender et al. |
| 5,894,521 A | 4/1999 | Conley |
| 5,901,178 A | 5/1999 | Lee et al. |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,949,973 A | 9/1999 | Yarom |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,018,722 A | 1/2000 | Ray |
| 6,029,126 A | 2/2000 | Malvar |
| 6,029,146 A | 2/2000 | Hawkins |
| 6,029,195 A | 2/2000 | Herz |
| 6,032,957 A | 3/2000 | Kiyosaki |
| 6,035,398 A | 3/2000 | Bjorn |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |
| 6,108,722 A | 8/2000 | Troeller |
| 6,131,162 A | 10/2000 | Yoshiura et al. |
| 6,134,535 A | 10/2000 | Belzberg |
| 6,138,239 A | 10/2000 | Veil |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,173,322 B1 | 1/2001 | Hu |
| 6,178,405 B1 | 1/2001 | Ouyang |
| 6,185,683 B1 | 2/2001 | Ginter |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florencio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,566 B1 | 5/2001 | Levine |
| 6,233,684 B1 | 5/2001 | Stefik et al. |
| 6,240,121 B1 | 5/2001 | Senoh |
| 6,253,193 B1 | 6/2001 | Ginter |
| 6,263,313 B1 | 7/2001 | Milstead et al. |
| 6,272,474 B1 | 8/2001 | Garcia |
| 6,272,535 B1 | 8/2001 | Iwamura |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,317,728 B1 | 11/2001 | Kane |
| 6,324,649 B1 | 11/2001 | Eyres |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,363,483 B1 | 3/2002 | Keshav |
| 6,363,488 B1 | 3/2002 | Ginter |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,402 B1 | 5/2002 | Ginter |
| 6,389,538 B1 | 5/2002 | Gruse et al. |
| 6,398,245 B1 | 6/2002 | Gruse |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,427,140 B1 | 7/2002 | Ginter |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,480,937 B1 | 11/2002 | Vorbach |
| 6,480,963 B1 | 11/2002 | Tachibana |
| 6,484,153 B1 | 11/2002 | Walker |
| 6,484,264 B1 | 11/2002 | Colvin |
| 6,493,457 B1 | 12/2002 | Quackenbush |
| 6,502,195 B1 | 12/2002 | Colvin |
| 6,510,513 B1 | 1/2003 | Danieli |
| 6,522,767 B1 | 2/2003 | Moskowitz et al. |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,539,475 B1 | 3/2003 | Cox et al. |
| 6,556,976 B1 | 4/2003 | Callen |
| 6,557,103 B1 | 4/2003 | Boncelet, Jr. et al. |
| 6,574,608 B1 | 6/2003 | Dahod |
| 6,584,125 B1 | 6/2003 | Katto |
| 6,587,837 B1 | 7/2003 | Spagna et al. |
| 6,590,996 B1 | 7/2003 | Reed |
| 6,594,643 B1 | 7/2003 | Freeny |
| 6,598,162 B1 | 7/2003 | Moskowitz |
| 6,601,044 B1 | 7/2003 | Wallman |
| 6,606,393 B1 | 8/2003 | Xie et al. |
| 6,611,599 B2 | 8/2003 | Natarajan |
| 6,615,188 B1 | 9/2003 | Breen |
| 6,618,188 B2 | 9/2003 | Haga |
| 6,647,424 B1 | 11/2003 | Pearson et al. |

(56) References Cited

U.S. PATENT DOCUMENTS

| | | |
|---|---|---|
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura |
| 6,687,683 B1 | 2/2004 | Harada et al. |
| 6,725,372 B1 | 4/2004 | Lewis et al. |
| 6,754,822 B1 | 6/2004 | Zhao |
| 6,775,772 B1 | 8/2004 | Binding et al. |
| 6,778,968 B1 | 8/2004 | Gulati |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,804,453 B1 | 10/2004 | Sasamoto |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,839,686 B1 | 1/2005 | Galant |
| 6,842,862 B2 | 1/2005 | Chow et al. |
| 6,853,726 B1 | 2/2005 | Moskowitz et al. |
| 6,856,967 B1 | 2/2005 | Woolston |
| 6,857,078 B2 | 2/2005 | Colvin |
| 6,865,747 B1 | 3/2005 | Mercier |
| 6,876,982 B1 | 4/2005 | Lancaster |
| 6,931,534 B1 | 8/2005 | Jandel et al. |
| 6,950,941 B1 | 9/2005 | Lee |
| 6,957,330 B1 | 10/2005 | Hughes |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |
| 6,983,058 B1 | 1/2006 | Fukuoka |
| 6,986,063 B2 | 1/2006 | Colvin |
| 6,990,453 B2 | 1/2006 | Wang |
| 7,003,480 B2 | 2/2006 | Fox |
| 7,007,166 B1 | 2/2006 | Moskowitz et al. |
| 7,020,285 B1 | 3/2006 | Kirovski et al. |
| 7,035,049 B2 | 4/2006 | Yamamoto |
| 7,035,409 B1 | 4/2006 | Moskowitz |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,095,715 B2 | 8/2006 | Buckman |
| 7,095,874 B2 | 8/2006 | Moskowitz et al. |
| 7,103,184 B2 | 9/2006 | Jian |
| 7,107,451 B2 | 9/2006 | Moskowitz |
| 7,123,718 B1 | 10/2006 | Moskowitz et al. |
| 7,127,615 B2 | 10/2006 | Moskowitz |
| 7,150,003 B2 | 12/2006 | Naumovich et al. |
| 7,152,162 B2 | 12/2006 | Moskowitz et al. |
| 7,159,116 B2 | 1/2007 | Moskowitz |
| 7,162,642 B2 | 1/2007 | Schumann et al. |
| 7,177,429 B2 | 2/2007 | Moskowitz et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Mihcak et al. |
| 7,266,697 B2 | 9/2007 | Kirovski et al. |
| 7,286,451 B2 | 10/2007 | Wirtz |
| 7,287,275 B2 | 10/2007 | Moskowitz |
| 7,289,643 B2 | 10/2007 | Brunk et al. |
| 7,310,815 B2 | 12/2007 | Yanovsky |
| 7,343,492 B2 | 3/2008 | Moskowitz et al. |
| 7,346,472 B1 | 3/2008 | Moskowitz et al. |
| 7,362,775 B1 | 4/2008 | Moskowitz |
| 7,363,278 B2 | 4/2008 | Schmelzer et al. |
| 7,409,073 B2 | 8/2008 | Moskowitz et al. |
| 7,444,506 B1 | 10/2008 | Datta |
| 7,457,962 B2 | 11/2008 | Moskowitz |
| 7,460,994 B2 | 12/2008 | Herre et al. |
| 7,475,246 B1 | 1/2009 | Moskowitz |
| 7,530,102 B2 | 5/2009 | Moskowitz |
| 7,532,725 B2 | 5/2009 | Moskowitz et al. |
| 7,568,100 B1 | 7/2009 | Moskowitz et al. |
| 7,630,379 B2 | 12/2009 | Morishita |
| 7,647,502 B2 | 1/2010 | Moskowitz |
| 7,647,503 B2 | 1/2010 | Moskowitz |
| 7,664,263 B2 | 2/2010 | Moskowitz |
| 7,719,966 B2 | 5/2010 | Luft |
| 7,743,001 B1 | 6/2010 | Vermeulen |
| 7,761,712 B2 | 7/2010 | Moskowitz |
| 7,779,261 B2 | 8/2010 | Moskowitz |
| 8,095,949 B1 | 1/2012 | Hendricks |
| 8,121,343 B2 | 2/2012 | Moskowitz |
| 8,161,286 B2 | 4/2012 | Moskowitz |
| 8,179,846 B2 | 5/2012 | Dolganow |
| 8,214,175 B2 | 7/2012 | Moskowitz |
| 8,265,278 B2 | 9/2012 | Moskowitz |
| 8,307,213 B2 | 11/2012 | Moskowitz |
| 8,400,566 B2 | 3/2013 | Terry |
| 2001/0010078 A1 | 7/2001 | Moskowitz |
| 2001/0029580 A1 | 10/2001 | Moskowitz |
| 2001/0043594 A1 | 11/2001 | Ogawa et al. |
| 2002/0009208 A1 | 1/2002 | Alattar |
| 2002/0010684 A1 | 1/2002 | Moskowitz |
| 2002/0026343 A1 | 2/2002 | Duenke |
| 2002/0056041 A1 | 5/2002 | Moskowitz |
| 2002/0057651 A1 | 5/2002 | Roberts |
| 2002/0069174 A1 | 6/2002 | Fox |
| 2002/0071556 A1 | 6/2002 | Moskowitz et al. |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0152179 A1 | 10/2002 | Racov |
| 2002/0161741 A1 | 10/2002 | Wang et al. |
| 2002/0188570 A1 | 12/2002 | Holliman |
| 2003/0002862 A1 | 1/2003 | Rodriguez |
| 2003/0005780 A1 | 1/2003 | Hansen |
| 2003/0023852 A1 | 1/2003 | Wold |
| 2003/0027549 A1 | 2/2003 | Kiel |
| 2003/0033321 A1 | 2/2003 | Schrempp |
| 2003/0126445 A1 | 7/2003 | Wehrenberg |
| 2003/0133702 A1 | 7/2003 | Collart |
| 2003/0200439 A1 | 10/2003 | Moskowitz |
| 2003/0219143 A1 | 11/2003 | Moskowitz et al. |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0086119 A1 | 5/2004 | Moskowitz |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2004/0243540 A1 | 12/2004 | Moskowitz et al. |
| 2005/0135615 A1 | 6/2005 | Moskowitz et al. |
| 2005/0160271 A9 | 7/2005 | Brundage et al. |
| 2005/0177727 A1 | 8/2005 | Moskowitz et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2006/0101269 A1 | 5/2006 | Moskowitz et al. |
| 2006/0140403 A1 | 6/2006 | Moskowitz |
| 2006/0251291 A1 | 11/2006 | Rhoads |
| 2006/0285722 A1 | 12/2006 | Moskowitz et al. |
| 2007/0011458 A1 | 1/2007 | Moskowitz |
| 2007/0028113 A1 | 2/2007 | Moskowitz |
| 2007/0064940 A1 | 3/2007 | Moskowitz et al. |
| 2007/0079131 A1 | 4/2007 | Moskowitz et al. |
| 2007/0083467 A1 | 4/2007 | Lindahl et al. |

(56) References Cited

U.S. PATENT DOCUMENTS

| | | | |
|---|---|---|---|
| 2007/0110240 A1 | 5/2007 | Moskowitz et al. |
| 2007/0113094 A1 | 5/2007 | Moskowitz et al. |
| 2007/0127717 A1 | 6/2007 | Herre et al. |
| 2007/0226506 A1 | 9/2007 | Moskowitz |
| 2007/0253594 A1 | 11/2007 | Lu et al. |
| 2007/0294536 A1 | 12/2007 | Moskowitz et al. |
| 2007/0300072 A1 | 12/2007 | Moskowitz |
| 2007/0300073 A1 | 12/2007 | Moskowitz |
| 2008/0005571 A1 | 1/2008 | Moskowitz |
| 2008/0005572 A1 | 1/2008 | Moskowitz |
| 2008/0016365 A1 | 1/2008 | Moskowitz |
| 2008/0022113 A1 | 1/2008 | Moskowitz |
| 2008/0022114 A1 | 1/2008 | Moskowitz |
| 2008/0028222 A1 | 1/2008 | Moskowitz |
| 2008/0046742 A1 | 2/2008 | Moskowitz |
| 2008/0075277 A1 | 3/2008 | Moskowitz et al. |
| 2008/0109417 A1 | 5/2008 | Moskowitz |
| 2008/0133927 A1 | 6/2008 | Moskowitz et al. |
| 2008/0151934 A1 | 6/2008 | Moskowitz et al. |
| 2009/0037740 A1 | 2/2009 | Moskowitz |
| 2009/0089427 A1 | 4/2009 | Moskowitz et al. |
| 2009/0190754 A1 | 7/2009 | Moskowitz et al. |
| 2009/0210711 A1 | 8/2009 | Moskowitz |
| 2009/0220074 A1 | 9/2009 | Moskowitz et al. |
| 2010/0002904 A1 | 1/2010 | Moskowitz |
| 2010/0005308 A1 | 1/2010 | Moskowitz |
| 2010/0064140 A1 | 3/2010 | Moskowitz |
| 2010/0077219 A1 | 3/2010 | Moskowitz |
| 2010/0077220 A1 | 3/2010 | Moskowitz |
| 2010/0098251 A1 | 4/2010 | Moskowitz |
| 2010/0106736 A1 | 4/2010 | Moskowitz |
| 2010/0153734 A1 | 6/2010 | Moskowitz |
| 2010/0182570 A1 | 7/2010 | Matsumoto et al. |
| 2010/0202607 A1 | 8/2010 | Moskowitz |
| 2010/0220861 A1 | 9/2010 | Moskowitz |
| 2010/0313033 A1 | 12/2010 | Moskowitz |
| 2011/0019691 A1 | 1/2011 | Moskowitz |
| 2011/0069864 A1 | 3/2011 | Moskowitz |
| 2011/0128445 A1 | 6/2011 | Carrieres |
| 2012/0057012 A1 | 3/2012 | Sitrick |
| 2013/0145058 A1 | 6/2013 | Shuholm |

FOREIGN PATENT DOCUMENTS

| | | |
|---|---|---|
| EP | 0581317 | 2/1994 |
| EP | 0581317 A2 | 2/1994 |
| EP | 0649261 | 4/1995 |
| EP | 0651554 | 5/1995 |
| EP | 0872073 | 7/1996 |
| EP | 1547337 | 3/2006 |
| EP | 1354276 | 12/2007 |
| NL | 1005523 | 9/1998 |
| WO | WO 9514289 | 5/1995 |
| WO | WO 9629795 | 9/1996 |
| WO | WO 9642151 | 12/1996 |
| WO | WO9701892 | 1/1997 |
| WO | WO9726733 | 1/1997 |
| WO | WO 9724833 | 7/1997 |
| WO | WO9726732 | 7/1997 |
| WO | WO 9744736 | 11/1997 |
| WO | WO9802864 | 1/1998 |
| WO | WO9837513 | 8/1998 |
| WO | WO 9952271 | 10/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO02003385 A1 | 10/2002 |

OTHER PUBLICATIONS

Jap. App. No. 2000-542907, entitled "Multiple Transform Utilization and Application for Secure Digital Watermarking"; which is a JP national stage of PCT/US1999/007262, published as WO/1999/052271, Oct. 14, 1999.

PCT Application No. PCT/US00/21189, filed Aug. 4, 2000, entitled, "A Secure Personal Content Server", Pub. No. WO/2001/018628 ; Publication Date: Mar. 15, 2001.

Schneier, Bruce, Applied Cryptography, 2nd Ed., John Wiley & Sons, pp. 9-10, 1996.

Menezes, Alfred J., Handbook of Applied Cryptography, CRC Press, p. 46, 1997.

1997, Merriam-Webster's Collegiate Dictionary, 10th Ed., Merriam Webster, Inc., p. 207.

Brealy, et al., Principles of Corporate Finance, "Appendix A—Using Option Valuation Models", 1984, pp. 448-449.

Copeland, et al., Real Options: A Practitioner's Guide, 2001 pp. 106-107, 201-202, 204-208.

Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.

Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.

Zhao, Jian. "A WWW Service to Embed and Prove Digital Copyright Watermarks", Proc. of the European conf. on Multimedia Applications, Services & Techniques Louvain-La-Nevve Belgium May 1996.

Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.AudioEng. Sc., vol. 43, No. 1/2, pp. 23-28 (1995).

Ten Kate, W. et al., A New Surround-Stereo-Surround Coding Techniques, J. Audio Eng.Soc., vol. 40,No. 5,pp. 376-383 (1992).

Gerzon, Michael et al., A High Rate Buried Data Channel for Audio CD, presentation notes, Audio Engineering Soc. 94th Convention (1993).

Sklar, Bernard, Digital Communications, pp. 601-603 (1988).

Jayant, N.S. et al., Digital Coding of Waveforms, Prentice Hall Inc., Englewood Cliffs, NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

Ten Kate, W. et al., "Digital Audio Carrying Extra Information", IEEE, CH 2847-2/90/0000-1097, (1990).

Van Schyndel, et al., "A digital Watermark," IEEE Int'l Computer Processing Conference, Austin,TX, Nov. 13-16, 1994, pp. 86-90.

Smith, et al. "Modulation and Information Hiding in Images", Springer Verlag, 1st Int'l Workshop, Cambridge, UK, May 30-Jun. 1, 1996, pp. 207-227.

1997, Kutter, Martin et al., "Digital Signature of Color Images Using Amplitude Modulation", SPIE-E197, vol. 3022, pp. 518-527.

Puate, Joan et al., "Using Fractal Compression Scheme to Embed a Digital Signature into an Image", SPIE-96 Proceedings, vol. 2915, Mar. 1997, pp. 108-118.

Swanson, Mitchell D.,et al., "Transparent Robust Image Watermarking", Proc. of the 1996 IEEE Int'l Conf. on Image Processing, vol. 111, 1996 , pp. 211-214.

Swanson, Mitchell D., et al. "Robust Data Hiding for Images", 7th IEEE Digital Signal Processing Workshop, Leon, Norway. Sep. 1-4, 1996, pp. 37-40.

(56) References Cited

OTHER PUBLICATIONS

Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Cox, et al., Secure Spread Spectrum Watermarking for Multimedia, NEC Research Institute, Techinal Report 95-10, pp. 33.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.
Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.
Moskowitz, "Bandwith as Currency", IEEE Multimedia, Jan.-Mar. 2003, pp. 14-21.
Moskowitz, Multimedia Security Technologies for Digital Rights Management, 2006, Academic Press, "Introduction—Digital Rights Management" pp. 3-22.
Rivest, et al., "PayWord and Micromint: Two Simple Micropayment Schemes," MIT Laboratory for Computer Science, Cambridge, MA, Apr. 27, 2001, pp. 1-18.
Tomsich, et al., "Towards a secure and de-centralized digital watermarking infrastructure for the protection of Intellectual Property", in Electronic Commerce and Web Technologies, Proceedings (ECWEB)(2000).
Moskowitz, "What is Acceptable Quality in the Application of Digital Watermarking: Trade-offs of Security; Robustness and Quality", IEEE Computer Society Proceedings of ITCC Apr. 10, 2002 pp. 80-84.
Lemma, et al. "Secure Watermark Embedding through Partial Encryption", International Workshop on Digital Watermarking ("IWDW" 2006). Springer Lecture Notes in Computer Science 2006 (to appear) 13.
Kocher, et al., "Self Protecting Digital Content", Technical Report from the CRI Content Security Research Initiative, Cryptography Research, Inc. 2002-2003 14 pages.
Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.
Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.
Konrad, K. et al., "Trust and Electronic Commerce—more than a technical problem," Proceedings of the 18th IEEE Symposium on Reliable Distributed Systems Oct. 19-22, 1999, pp. 360-365 Lausanne.
Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.
European Search Report & European Search Opinion in EP07112420.
STAIND (The Singles 1996-2006), Warner Music—Atlantic, Pre-Release CD image, 2006, 1 page.
Radiohead ("Hail To The Thief"), EMI Music Group—Capitol, Pre-Release CD image, 2003, 1 page.
U.S. Appl. No. 60/169,274, filed Dec. 7, 1999, entitled "Systems, Methods and Devices for Trusted Transactions".
U.S. Appl. No. 60/234,199, filed Sep. 20, 2000, "Improved Security Based on Subliminal and Supraliminal Channels for Data Objects".
U.S. Appl. No. 09/671,739, filed Sep. 29, 2000, entitled "Method and Device for Monitoring and Analyzing Signals".
Tirkel, A.Z., "A Two-Dimensional Digital Watermark", Scientific Technology, 686, 14, date unknown.
EP0581317A2, Moved to Foreign Patent Pubs as F-028.
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.
Delaigle, J.-F., et al. "Digital Watermarking," Proceedings of the SPIE, vol. 2659, Feb. 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.

(56) References Cited

OTHER PUBLICATIONS

Joseph J.K. O'Ruanaidh and Thierry Pun, "Rotation, Scale and Translation Invariant Digital Image Watermarking", Submitted to Signal Processing Aug. 21, 1997, 19 pages.
OASIS (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffing.txt Apr. 24, 1998, 9 pp.
PortalPlayer, PP5002 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t-abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
PCT Application No. PCT/US95/08159, filed Jun. 26, 1995, entitled, "Digital Information Commodities Exchange with Virtual Menuing", published as WO/1997/001892; Publication Date: Jan. 16, 1997.
PCT Application No. PCT/US96/10257, filed Jun. 7, 1996, entitled "Steganographic Method and Device"—corresponding to—EPO Application No. 96919405.9, entitled "Steganographic Method and Device", published as WO/1996/042151; Publication Date: Dec. 27, 1996.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.
PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.
PCT Application No. PCT/US00/18411, filed Jul. 5, 2000, entitled, "Copy Protection of Digital Data Combining Steganographic and Cryptographic Techniques".
PCT Application No. PCT/US00/33126, filed Dec. 7, 2000, entitled "Systems, Methods and Devices for Trusted Transactions", published as WO/2001/043026; Publication Date: Jun. 14, 2001.
EPO Divisional Patent Application No. 07112420.0, entitled "Steganographic Method and Device" corresponding to PCT Application No. PCT/US96/10257, published as WO/1996/042151, Dec. 27, 1996.
U.S. Appl. No. 60/222,023, filed Jul. 31, 2007 entitled "Method and apparatus for recognizing sound and signals in high noise and distortion".

"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csnetwork.com/glossarys.html.
QuinStreet Inc. 2010 What is steganography?—A word definition from the Webopedia Computer Dictionary http://www.webopedia.com/term/steganography.html.
Graham, Robert Aug. 21, 2000 "Hacking Lexicon" http://robertgraham.com/pubs/hacking-dict.html.
2010 Farkex, Inc 2010 "Steganography definition of steganography in the Free Online Encyclopedia" http://encyclopedia2.Thefreedictionary.com/steganography.
Horowitz, et al., The Art of Eletronics. $2^{nd}$ Ed., 1989, pp. 7.
Jimmy eat world ("futures"), Interscope Records, Pre-Release CD image, 2004, 1 page.
Aerosmith ("Just Push Play"), Pre-Release CD image, 2001, 1 page.
Phil Collins(Testify) Atlantic, Pre-Release CD image, 2002, 1 page.
U. are U. Reviewer's Guide (U are U Software, 1998).
U. are U. wins top honors!—Marketing Flyer (U. are U. Software, 1998).
Digital Persona, Inc., *U. are U. Fingerprint Recognition System: User Guide* (Version 1.0, 1998).
Digital Persona White Paper pp. 8-9 published Apr. 15, 1998.
Digital Persona, Inc., "Digital Persona Releases U. are. U Pro Fingerprint Security Systems for Windows NT, 2000, '98, '95", (Feb. 2000).
SonicWall, Inc. 2011 "The Network Security SonicOS Platform—Deep Packet Inspection" http://www.sonicwall.com/us/en/products/Deep_Packet_Inspection.html.
Rick Merritt, PARC hosts summit on content-centric nets, EETimes, Aug. 12, 2011, http://www.eetimes.com/electronics-news/4218741/PARC-hosts-summit-on-content-centric-nets.
Afanasyev, et. al., Communications of the ACM: Privacy Preserving Network Forensics 2011.
SonicWall, Inc., 2008 "The Advantages of a Multi-core Architecture in Network Security Appliances" http://www.sonicwall.com/downloads/WP-ENG-010_Multicore . . . .
2013, Voip-Pal.Com Inc's Lawful Intercept Patent Application Receives the Allowance for Issuance as a Patent, http://finance.yahoo.com/news/voip-pal-com-inc-lawful-133000133.html.
Deep Content Inspection—Wikipedia, the free encyclopedia, http://en.wikipedia.org/wiki/Deep_content_inspection (last visited Apr. 4, 2013).
Dexter, et. al, "Multi-view Synchronization of Human Actions and Dynamic Scenes" pp. 1-11, 2009.
Kudrle, et al., "Fingerprinting for Solving A/V Synchronization Issues within Broadcast Environments", 2011.
2010, Junego, et. al., "View-Independent Action Recognition from Temporal Self-Similarities", 2011.
Dexter, et al., "Multi-view Synchronization of Image Sequences", 2009.
*Blue Spike, LLC.* v. *Texas Instruments, Inc et. al,* (No. 6:12-CV-499-MHS), Audible Magic Corporations's amended Answer ( E.D. TX filed Jul. 15, 2013) (Document 885 p. ID 9581), (PACER).
Moskowitz, "Introduction—Digital Rights Management," Multimedia Security Technologies for Digital Rights Management (2006), Elsevier.
George, Mercy; Chouinard, Jean-Yves; Georgana, Nicolas. Digital Watermarking of Images and video using Direct Sequence Spread Spectrum Techniques. 1999 IEEE Canadian Conference on Electrical and Computer Engineering vol. 1. Pub. Date: 1999 Relevant pp. 116-121. http://ieeexplore.ieee.org/stamp/stamp.jsp?tp=arnumber=807181.
Apr. 4, 2014, Shazam Entertainment Limited's Amended Answer to Blue Spike, LLC's complaint and counterclaims against Blue Spike LLC, Blue Spike, Inc and Scott A. Moskowitz , *Shazam Entertainment Ltd* v. *Blue Spike, LLC, Blue Spike, Inc, and Scott Moskowitz* (E.D.T.X Dist Ct.) Case No. 6:12-CV-00499-MHS.
Apr. 4, 2014, Audible Magic Corporation's Second Amended Answer to Blue Spike LLC's Original Complaint for patent infringement and counterclaims against Blue Spike LLC, Blue Spike, Inc and Scott Moskowitz. *Blue Spike LLC* v. *Texas Instruments, Audible Magic Corporation* (E.D.T.X Dist Ct.) Case No. 6:12-CV-499-MHS.

MULTIPLE TRANSFORM UTILIZATION AND APPLICATION FOR SECURE DIGITAL WATERMARKING

CROSS-REFERENCE TO RELATED APPLICATIONS

This application is a continuation of U.S. application Ser. No. 13/937,106, filed Jul. 8, 2013, which is a continuation of U.S. application Ser. No. 12/799,894, filed May 4, 2010, now U.S. Pat. No. 8,542,831, issued Sep. 24, 2013, which is a continuation of U.S. application Ser. No. 11/358,874, filed Feb. 21, 2006, now U.S. Pat. No. 7,738,659, issued Jun. 15, 2010, which is a division of U.S. patent application Ser. No. 09/644,098, filed Aug. 23, 2000, now U.S. Pat. No. 7,035,409, issued Apr. 25, 2006, which is a division of U.S. patent application Ser. No. 09/053,628, filed Apr. 2, 1998, now U.S. Pat. No. 6,205,249, issued on Mar. 20, 2001. The previously identified patents and/or patent applications are hereby incorporated by reference, in their entireties as if fully stated herein. This application is related to U.S. patent application Ser. No. 08/587,943, filed Jan. 17, 1996, entitled "Method for Stega-Cipher Protection of Computer Code," (issued as U.S. Pat. No. 5,745,569 on Apr. 28, 1998); the entire disclosure of which is hereby incorporated by reference.

FIELD OF THE INVENTION

The invention relates to the protection of digital information. More particularly, the invention relates to multiple transform utilization and applications for secure digital watermarking.

BACKGROUND OF THE INVENTION

Increasingly, commercially valuable information is being created and stored in "digital" form. For example, music, photographs and video can all be stored and transmitted as a series of numbers, such as 1's and 0's. Digital techniques let the original information be recreated in a very accurate manner. Unfortunately, digital techniques also let the information be easily copied without the owner's permission.

Digital watermarks exist at a convergence point where creators and publishers of digitized multimedia content demand local, secure identification and authentication of content. Because piracy discourages the distribution of valuable digital information, establishing responsibility for copies and derivative copies of such works is important. The goal of a digital watermark system is to insert a given information signal or signals in such a manner as to leave little or no artifacts, with one standard being perceptibility, in the underlying content signal, while maximizing its encoding level and "location sensitivity" in the signal to force damage to the content signal when removal is attempted. In considering the various forms of multimedia content, whether "master," stereo, National Television Standards Committee (NTSC) video, audio tape or compact disc, tolerance of quality will vary with individuals and affect the underlying commercial and aesthetic value of the content. It is desirable to tie copyrights, ownership rights, purchaser information or some combination of these and related data into the content in such a manner that the content undergoes damage, and therefore reduction of its value, with subsequent unauthorized distribution, commercial or otherwise. Digital watermarks address many of these concerns and research in the field has provided a rich basis for extremely robust and secure implementations.

Of particular concern is the balance between the value of a digitized "piece" of content and the cost of providing worthwhile "protection" of that content. In a parallel to real world economic behavior, the perceived security of a commercial bank does not cause people to immediately deposit cash because of the expense and time required to perform a bank deposit. For most individuals, possession of a US$100 bill does not require any protection beyond putting it into a wallet. The existence of the World Wide Web, or "Web," does not implicitly indicate that value has been created for media which can be digitized, such as audio, still images and other media. The Web is simply a medium for information exchange, not a determinant for the commercial value of content. The Web's use to exchange media does, however, provide information that helps determine this value, which is why responsibility over digitized content is desirable. Note that digital watermarks are a tool in this process, but they no not replace other mechanisms for establishing more public issues of ownership, such as copyrights. Digital watermarks, for example, do not replace the "historical average" approach to value content. That is, a market of individuals willing to make a purchase based solely on the perceived value of the content. By way of example, a picture distributed over the Internet, or any other electronic exchange, does not necessarily increase the underlying value of the picture, but the opportunity to reach a greater audience by this form of "broadcast" may be a desirable mechanism to create "potentially" greater market-based valuations. That decision rests solely with the rights holder in question.

Indeed, in many cases, depending on the time value of the content, value may actually be reduced if access is not properly controlled. With a magazine sold on a monthly basis, it is difficult to assess the value of pictures in the magazine beyond the time the magazine is sold. Compact disc valuations similarly have time-based variables, as well as tangible variables such as packaging versus the package-less electronic exchange of the digitized audio signals. The Internet only provides a means to more quickly reach consumers and does not replace the otherwise "market-based" value. Digital watermarks, properly implemented, add a necessary layer of ownership determination which will greatly assist in determining and assessing value when they are "provably secure." The present invention improves digital watermarking technology while offering a means to properly "tamper proof" digitized content in a manner analogous to methods for establishing authenticity of real world goods.

A general weakness in digital watermark technology relates directly to the way watermarks are implemented. Too many approaches leave detection and decode control with the implementing party of the digital watermark, not the creator of the work to be protected. This fundamental aspect of various watermark technologies removes proper economic incentives for improvement of the technology when third parties successfully exploit the implementation. One specific form of exploitation obscures subsequent watermark detection. Others regard successful over encoding using the same watermarking process at a subsequent time.

A set of secure digital watermark implementations address this fundamental control issue, forming the basis of "key-based" approaches. These are covered by the following patents and pending applications, the entire disclosures of which are hereby incorporated by reference: U.S. Pat. No. 5,613,004 entitled "Steganographic Method and Device" and its derivative U.S. patent application Ser. No. 08/775,216 (issued as U.S. Pat. No. 5,687,236 on Nov. 11, 1997), U.S. patent application Ser. No. 08/587,944 entitled "Human Assisted Random Key Generation and Application for Digital Watermark System," (issued as U.S. Pat. No. 5,822,432 on Oct. 13, 1998); U.S. patent application Ser. No. 08/587,943 entitled "Method for Stega-Cipher Protection of Computer Code," (issued as U.S. Pat. No. 5,745,569 on Apr. 28, 1997); U.S. patent application Ser. No. 08/677,435 entitled "Optimization Methods for the Insertion, Protection, and Detection of Digital Watermarks in Digitized Data," (issued as U.S. Pat. No. 5,889,868 on Mar. 30, 1999). and U.S. patent application Ser. No. 08/772,222 entitled "Z-Transform Implementation of Digital Watermarks," (issued as U.S. Pat. No. 6,078,664). Public key crypto-systems are described in U.S. Pat. Nos. 4,200,770, 4,218,582, 4,405,829 and 4,424,414, the entire disclosures of which are also hereby incorporated by reference.

U.S. Pat. No. 5,613,004 provides the following example embodiment of encoding and decoding:

III. Example Embodiment of Encoding and Decoding

A modification to standard steganographic technique is applied in the frequency domain described above, in order to encode additional information into the audio signal.

In a scheme adapted from cryptographic techniques, 2 keys are used in the actual encode and decode process. For the purposes of this invention the keys are referred to as masks. One mask, the primary, is applied to the frequency axis of FFT results, the other mask is applied to the time axis (this will be called the convolution mask). The number of bits comprising the primary mask are equal to the sample window size in samples (or the number of frequency bands computed by the FFT process), 128 in this discussion. The number of bits in the convolution mask are entirely arbitrary. This implementation will assume a time mask of 1024 bits. Generally the larger the key, the more difficult it is to guess.

Prior to encoding, the primary and convolution masks described above are generated by a cryptographically secure random generation process. It is possible to use a block cipher like DES in combination with a sufficiently pseudo-random seed value to emulate a cryptographically secure random bit generator. These keys will be saved along with information matching them to the sample stream in question in a database for use in decoding, should that step become necessary.

Prior to encoding, some additional information to be encoded into the signal is prepared and made available to the encoder, in a bit addressable manner (so that it may be read one bit at a time). If the size of the sample stream is known and the efficiency characteristics of the stega-cipher implementation are taken into account, a known limit may be imposed on the amount of this additional information.

The encoder captures one sample window at a time from the sample stream, in sequential, contiguous order. The encoder tracks the sequential number of each window it acquires. The first window is 0. When the number of windows processed reaches the number of bits in the window mask, minus one, the next value of the window counter will be reset to 0.

This counter is the convolution index or phase. In the current implementation it is used as a simple index into the convolution bitmask. In anticipated developments it will be used to perform convolution operations on the convolution mask to determine which bit to use. For instance the mask might by rotated by a number corresponding to the phase, in bits to the left and XORed with the primary mask to produce a new mask, which is then indexed by the phase. There are many possibilities for convolution.

The encoder computes the discrete FFT of the sample window.

Starting with the lowest frequency band, the encoder proceeds through each band to the highest, visiting each of the 128 frequency bands in order. At each band value, the encoder takes the bit of the primary mask corresponding to the frequency band in question, the bit of the convolution mask corresponding to the window in question, and passes these values into a boolean function. This function is designed so that it has a near perfectly random output distribution. It will return true for approximately 50% of its input permutations, and false for the other 50%. The value returned for a given set of inputs is fixed, however, so that it will always return the same value given the same set of inputs.

If the function returns true, the current frequency band in the current window is used in the encoding process, and represents a valid piece of the additional information encoded in the signal. If the function returns false, this cell, as the frequency band in a given window is called, is ignored in the process. In this manner it is made extremely difficult to extract the encoded information from the signal without the use of the exact masks used in the encoding process. This is one place in which the stega-cipher process departs from traditional steganographic implementations, which offer a trivial decode opportunity if one knows the information is present. While this increases the information storage capacity of the carrier signal, it makes decoding trivial, and further degrades the signal. Note that it is possible and desirable to modify the boolean cell flag function so that it returns true <50% of the time. In general, the fewer cells actually used in the encode, the more difficult they will be to find and the less degradation of content will be caused, provided the function is designed correctly. There is an obvious tradeoff in storage capacity for this increased security and quality.

The encoder proceeds in this manner until a complete copy of the additional information has been encoded in the carrier signal. It will be desirable to have the encoder encode multiple copies of the additional information continuously over the duration of the carrier signal, so that a complete instance of this information may be recovered from a smaller segment of a larger signal which has been split into discontinuous pieces or otherwise edited. It is therefore desirable to minimize the size of the information to be encoded using both compact design and pre-encoding compression, thus maximizing redundant encoding, and recoverability from smaller segments. In a practical implementation of this system it is likely the information will be first compressed by a known method, and then encrypted using public-key techniques, before being encoded into the carrier signal.

The encoder will also prepare the package of additional information so that it contains an easily recognizable start of message delimeter, which can be unique to each encoding and stored along with the keys, to serve as a synchronization signal to a decoder. The detection of this delimeter in a decoding window signifies that the decoder can be reasonably sure it is aligned to the sample stream correctly and can proceed in a methodic window by window manner. These delimeters will require a number of bits which minimizes the probability that this bit sequence is not reproduced in a random occurrence, causing an accidental misalignment of the decoder. A minimum of 256 bits is recommended. In the current implementation 1024 bits representing a start of message delimeter are used. If each sample is random, then each bit has a 50% probably of matching the delimeter and the conditional probability of a random match would be $\frac{1}{2}^{1024}$. In practice, the samples are probably somewhat less than random, increasing the probability of a match somewhat.

The decode process uses the same masks in the same manner, only in this case the information is extracted one bit at a time from the carrier signal.

The decoder is assumed to have access to the proper masks used to encode the information originally. These masks might be present in a database, which can be indexed by a value, or values computed from the original content, in a manner insensitive to the modifications to the content caused by the stega-cipher process. So, given an arbitrary piece of content, a decoder might first process the content to generate certain key values, and then retrieve the decode masks associated with the matching key values from the database. In the case where multiple matches occur, or none are found, it is conceivable that all mask sets in the database could be tried sequentially until a valid decode is achieved, or not, indicating no information is present.

In the application of this process, it is anticipated that encoding operations may be done on a given piece of content up to 3 times, each adding new information and using new masks, over a sub-segment of the content, and that decode operations will be done infrequently. It is anticipated that should it become necessary to do a search of a large number of masks to find a valid decode, that this process can be optimized using a guessing technique based on close key matching, and that it is not a time critical application, so it will be feasible to test large numbers of potential masks for validity on a given piece of content, even if such a process takes days or weeks on powerful computers to do a comprehensive search of known mask sets.

The decode process is slightly different in the following respect. Whereas the encoding process can start at any arbitrary point in the sample stream, the decode process does not known where the encode process began (the exact offset in samples to the start of the first window). Even though the encode process, by convention, starts with sample 0, there is no guarantee that the sample stream has not been edited since encoding, leaving a partial window at the start of the sample stream, and thus requiring the decoder to find the first complete window to start the decode. Therefore, the decode process will start at the first sample, and shift the sample window along by 1 sample, keeping the window index at 0, until it can find a valid decode delimeter encoded in the window. At this point, the decoder knows it has synchronized to the encoder, and can then proceed to process contiguous windows in a more expedient manner.

By way of improving these digital watermark security methods, utilization of multiple transforms, manipulation of signal characteristics and the requisite relationship to the mask set or "key" used for encoding and decoding operations are envisioned, as are optimized combinations of these methods. While encoding a watermark may ultimately differ only slightly in terms of the transforms used in the encoding algorithm, the greater issues of an open, distributed architecture requires more robust approaches to survive attempts at erasure, or even means for making detection of the watermark impossible. These "attacks," when computationally compared, may be diametrically related. For instance, cropping and scaling differ in signal processing orientation, and can result in the weakening of a particular watermarking approach but not all watermarking approaches.

Currently available approaches that encode using either a block-based or entire data set transform necessarily encode data in either the spatial or frequency domains, but never both domains. A simultaneous crop and scale affects the spatial and frequency domains enough to obscure most available watermark systems. The ability to survive multiple manipulations is an obvious benefit to those seeking to ensure the security of their watermarked media. The present invention seeks to improve on key-based approaches to watermarking previously disclosed, while offering greater control of the subsequently watermarked content to rights owners and content creators.

Many currently available still image watermarking applications are fundamentally different from the key-based implementations. Such products include products offered by Digimarc and Signum, which seek to provide a robust watermark by encoding watermark messages that rely entirely on comparisons with the original image for decode operations. The subsequent result of the transform, a discrete cosine transform performed in blocks, is digital signed. The embedded watermarks lack any relationship to the perceptual qualities of the image, making inverse application of the publicly available decoders a very good first line of attack. Similarly, the encoding process may be applied by third parties, as demonstrated by some robustness tests, using one process to encode over the result of an image watermarked with another process. Nonrepudiation of the watermark is not possible, because Digimarc and Signum act as the repository of all registrations of the image's ownership.

Another line of attack is a low pass filter that removes some of the high frequency noise that has been added, making error-free detection difficult or impossible. Finally, many tests of a simple JPEG transform indicate the watermarks may not survive as JPEG is based on the same transforms as the encoding transforms used by the watermarking process. Other notable implementations, such as that offered by Signafy (developed by NEC researchers), appear to encode watermark messages by performing a transform of the entire image. The goal of this process is to more consistently identify "candidate" watermark bits or regions of the image to encode in perceptually significant regions of the signal. Even so, Signafy relies on the original unwatermarked image to accomplish decoding.

All of these methods still rely on the original unwatermarked image to ensure relatively error-free detection of the watermarks. The steganographic method seeks to provide watermark security without an original unwatermarked copy of the media for decode operations, as well as providing users cryptographic security with ciphered symmetric keys. That is, the same key is used for encode and decode operations. Public key pairs, where each user has a public/private key pair to perform asymmetric encode and decode operations, can also be used. Discussions of public key encryption and the benefits related to encryption are well documented. The growing availability of a public key infrastructure also indicates recognition of provable security. With such key-based implementations of watermarking, security can be off-loaded to the key, providing for a layered approach to security and authentication of the watermark message as well as the watermarked content.

It is known that attacks on the survivability of other implementations are readily available. Interesting network-based attacks on the watermark message are also known which fool the central registration server into assuming an image is owned by someone other than the registered owner. This also substantiates the concern that centralized watermarking technologies are not robust enough to provide proper assurances as to the ownership of a given digitized copy of an multimedia work.

Because the computational requirements of performing multiple transforms may not be prohibitive for certain media types, such as still images and audio, the present invention seeks to provide a means to securely watermark media without the need for an original unwatermarked copy to perform decoding. These transforms may be performed in a manner not plainly evident to observers or the owner of the content, who may assume the watermark is still detectable. Additionally, where a particular media type is commonly compressed (JPEG, MPEG, etc.), multiple transforms may be used to properly set the mask sets, prior to the watermarking process, to alert a user to survivability prior to the release of a watermarked, and thus perceived, "safe" copy to unknown parties. The result of the present invention is a more realistic approach to watermarking taking the media type, as well as the provable security of the keys into consideration. A more trusted model for electronic commerce is therefore possible.

The creation of an optimized "envelope" for insertion of watermarks to establish secured responsibility for digitally-sampled content provides the basis of much watermark security but is also a complementary goal of the present invention. The predetermined or random key that is generated is not only an essential map to access the hidden information signal, but is also the a subset of the original signal making direct comparisons with the original signal unnecessary. This increases the overall security of the digital watermark.

Survival of simultaneous cropping and scaling is a difficult task with image and audio watermarking, where such transformations are common with the inadvertent use of images and audio, and with intentional attacks on the watermark. The corresponding effects in audio are far more obvious, although watermarks which are strictly "frequency-based," such as variations of spread spectrum, suffer from alignment issues in audio samples which have been "cropped," or clipped from the original length of the piece. Scaling is far more noticeable to the human auditory system, though slight changes may affect frequency-only-type watermarks while not being apparent to a consumer. The far greater threat to available audio watermark applications, most of which are variations of frequency-based embedded signaling, are generally time-based transformations, including time-based compression and expansion of the audio signal. Signafy is an example of spread spectrum-based watermarking, as are applications by Solana Technology, CRL, BBN, MIT, etc. "Spatial domain" approaches are more appropriate designations for the technologies deployed by Digimarc, Signum, ARIS, Arbitron, etc. Interestingly, a time-based approached when considered for images is basically a "spatial-based" approach. The pixels are "convolutional." The difference being that the "spread spectrum-ed" area of the frequencies is "too" well-defined and thus susceptible to over-encoding of random noise at the same sub-bands as that of the embedded signal.

Giovanni uses a block-based approach for the actual watermark. However, it is accompanied by image-recognition capable of restoring a scaled image to its original scale. This "de-scaling" is applied before the image is decoded. Other systems used a "differencing" of the original image with the watermarked image to "de-scale." It is clear that de-scaling is inherently important to the survival of any image, audio or video watermark. What is not clear is that the differencing operation is acceptable from a security standpoint. Moreover, differencing that must be carried out by the watermarking "authority," instead of the user or creator of the image, causes the rights owner to lose control over the original unwatermarked content. Aside from utilizing the mask set within the encoding/decoding key/key pair, the original signal must be used. The original is necessary to perform detection and decoding, although with the attacks described above it is not possible to clearly establish ownership over the watermarked content.

In view of the foregoing, it can be appreciated that a substantial need exists for multiple transform utilization and applications for secure digital watermarking that solve the problems discussed above.

SUMMARY OF THE INVENTION

The disadvantages of the art are alleviated to a great extent by multiple transform utilization and applications for secure digital watermarking In one embodiment of the present invention, digital blocks in digital information to be protected are transformed into the frequency domain using a fast Fourier transform. A plurality of frequencies and associated amplitudes are identified for each of the transformed digital blocks and a subset of the identified amplitudes is selected for each of the digital blocks using a primary mask from a key. Message information is selected from a message using a transformation table generated with a convolution mask. The chosen message information is encoded into each of the transformed digital blocks by altering the selected amplitudes based on the selected message information.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
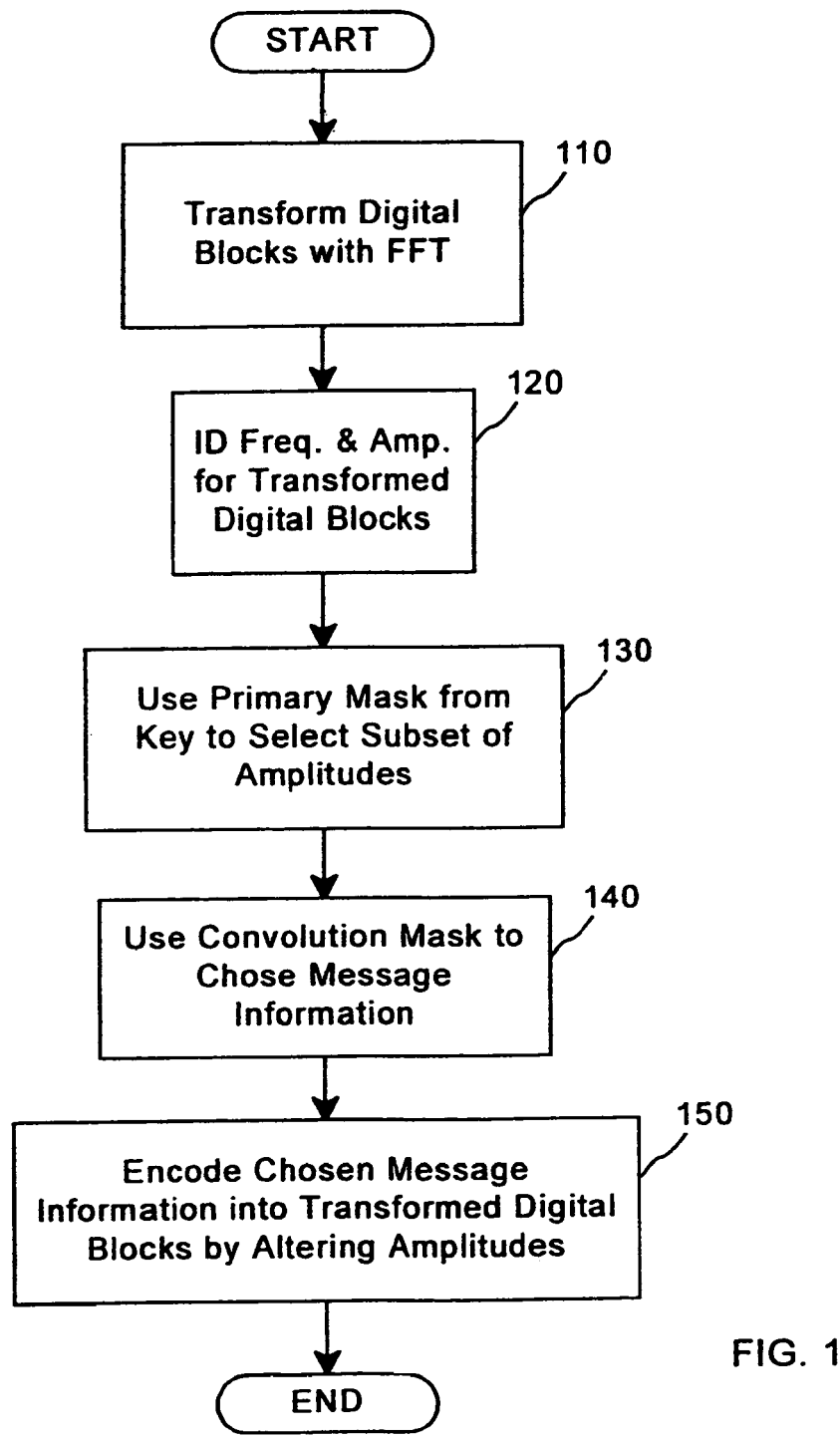
FIG. 1 is a block flow diagram of a method for encoding digital information according to an embodiment of the present invention.

In accordance with an embodiment of the present invention, multiple transforms are used with respect to secure digital watermarking. There are two approaches to watermarking using frequency-domain or spatial domain transformations: using small blocks or using the entire data-set. For time-based media, such as audio or video, it is only practical to work in small pieces, since the entire file can be many megabytes in size. For still images, however, the files are usually much smaller and can be transformed in a single operation. The two approaches each have their own strengths. Block-based methods are resistant to cropping. Cropping is the cutting out or removal of portions of the signal. Since the data is stored in small pieces, a crop merely means the loss of a few pieces. As long as enough blocks remain to decode a single, complete watermark, the crop does not remove the mark. Block-based systems, however, are susceptible to scaling. Scaling, such as affine scaling or "shrinking," leads to a loss of the high frequencies of the signal. If the block size is 32 samples and the data is scaled by 200%, the relevant data now covers 64 samples. However, the decoder still thinks that the data is in 32 samples, and therefore only uses half the space necessary to properly read the watermark. Whole-set approaches have the opposite behavior. They are very good at surviving scaling, since they approach the data as a whole, and generally scale the data to a particular size before encoding. Even a small crop, however, can throw off the alignment of the transform and obscure the watermark.

With the present invention, and by incorporation of previously disclosed material, it is now possible to authenticate an image or song or video with the encoding key/key pair, eliminating false positive matches with cryptography and providing for the communication of a copyright through registration with third party authorities, instead of the original unwatermarked copy.

The present invention provides an obvious improvement over the prior art while improving on previous disclosures by offsetting coordinate values of the original signal onto the key, which are then subsequently used to perform decode or detection operations by the user or authorized "key-holder." This offsetting is necessary with content which may have a watermark "payload," the amount of data that may successfully be encoded, based on Shannon's noisy channel coding theorem, that prevents enough invisible "saturation" of the signal with watermark messages to afford the owner the ability to detect a single message. An example, it is entirely possible that some images may only have enough of a payload to carry a single 100 bit message, or 12 ASCII characters. In audio implementations tested by the present inventor, 1000 bits per second are inaudibly encoded in a 16 bit 44.1 kHz audio signal. Most electronically available images do not have enough data to afford similar "payload" rates. Thus the premise that simultaneous cropping and scaling survival is more difficult for images than a comparable commercially available audio or video track. The added security benefit is that the more limited randomizer of a watermarking system based on spread spectrum or frequency-only applications, the random value of the watermark data "hopping" over a limited signaling band, is that the key is also an independent source of ciphered or random data used to more effectively encode in a random manner. The key may actually have random values larger than the watermark message itself, measured in bits. The watermark decoder is assured that the image is in its original scale, and can decide whether it has been cropped based on its "de-scaled" dimensions.

The benefits of a system requiring keys for watermarking content and validating the distribution of said content is obvious. Different keys may be used to encode different information while secure one way hash functions, digital signatures, or even one-time pads may be incorporated in the key to secure the embedded signal and afford nonrepudiation and validation of the watermarked image and "its" key/key pair. Subsequently, these same keys may be used to later validate the embedded digital signature only, or fully decode the digital watermark message. Publishers can easily stipulate that content not only be digitally watermarked, but that distributors must check the validity of the watermarks by performing digital signature checks with keys that lack any other functionality.

Some discussion of secure digital watermarking has begun to appear. Leighton describes a means to prevent collusion attacks in digital watermarks in U.S. Pat. No. 5,664,018. Leighton, however, may not actually provide the security described. For example, in particularly instances where the watermarking technique is linear, the "insertion envelope" or "watermarking space" is well-defined and thus susceptible to attacks less sophisticated than collusion by unauthorized parties. Over encoding at the watermarking encoding level is but one simple attack in such linear implementations. Another consideration ignored by Leighton is that commercially-valuable content in many cases may already exist in a unwatermarked form somewhere, easily accessible to potential pirates, gutting the need for any type of collusive activity. Such examples as compact disc or digitally broadcast video abound. Digitally signing the embedded signal with preprocessing of watermark data is more likely to prevent successful collusion. Depending on the media to be watermarked, highly granular watermarking algorithms are far more likely to successfully encode at a level below anything observable given quantization artifacts, common in all digitally-sampled media, than expectations that a baseline watermark has any functionality.

Furthermore, a "baseline" watermark as disclosed is quite subjective. It is simply described elsewhere in the art as the "perceptually significant" regions of a signal: so making a watermarking function less linear or inverting the insertion of watermarks would seem to provide the same benefit without the additional work required to create a "baseline" watermark. Indeed, watermarking algorithms should already be capable of defining a target insertion envelope or region without additional steps. Further, earlier disclosed applications by the present invention's inventor describe watermarking techniques that can be set to encode fewer bits than the available watermarking region's "bit-space" or encoding unrelated random noise in addition to watermark data to confuse possible collusive or other attempts at erasure. The region of "candidate bits" can be defined by any number of compression schemes or transformations, and the need to encode all of the bits is simply unnecessary. What is evident is that Leighton does not allow for initial prevention of attacks on an embedded watermark as the content is visibly or audibly unchanged. Moreover, encoding all of the bits may actually act as a security weakness to those who can replicate the regions with a knowledge of the encoding scheme. Again, security must also be offset outside of the actual watermark message to provide a truly robust and secure watermark implementation.

In contrast, the present invention may be implemented with a variety of cryptographic protocols to increase both confidence and security in the underlying system. A predetermined key is described as a set of masks. These masks may include primary, convolution and message delimeters but may extend into additional domains such as digital signatures of the message. In previous disclosures, the functionality of these masks is defined solely for mapping. Public and private keys may be used as key pairs to further increase the unlikeliness that a key maybe compromised. Prior to encoding, the masks described above are generated by a cryptographically secure random generation process. A block cipher, such as DES, in combination with a sufficiently random seed value emulates a cryptographically secure random bit generator. These keys will be saved along with information matching them to the sample stream in question in a database for use in descrambling and subsequent detection or decode operation.

These same cryptographic protocols can be combined with embodiments of the present invention in administering streamed content that requires authorized keys to correctly display or play said streamed content in an unscrambled manner. As with digital watermarking, symmetric or asymmetric public key pairs may be used in a variety of implementations. Additionally, the need for certification authorities to maintain authentic key-pairs becomes a consideration for greater security beyond symmetric key implementations, where transmission security is a concern.

The following describes a sample embodiment of a system that protects digital information according to the present invention. Referring now in detail to the drawings wherein like parts are designated by like reference numerals throughout, there is illustrated in FIG. 1 a block flow diagram of a method for encoding digital information according to an embodiment of the present invention. An image is processed by "blocks," each block being, for example, a 32×32 pixel region in a single color channel At step 110, each block is transformed into the frequency domain using a spectral transform or a Fast Fourier Transform (FFT). The largest 32 amplitudes are identified and a subset of these 32 are selected using the primary mask from the key at steps 120 and 130. One message bit is then encoded into each block at steps 140 and 150. The bit is chosen from the message using a transformation table generated using the convolution mask. If the bit is true, the selected amplitudes are reduced by a user defined strength fraction. If the bit is false, the amplitudes are unchanged.

Each of the selected amplitudes and frequencies are stored in the key. After all of the image has been processed, a diagonal stripe of pixels is saved in the key. This stripe can, for example, start in the upper left corner and proceed at a 45 degree angle through the image. The original dimensions of the image are also stored in the key.

Figure 2:
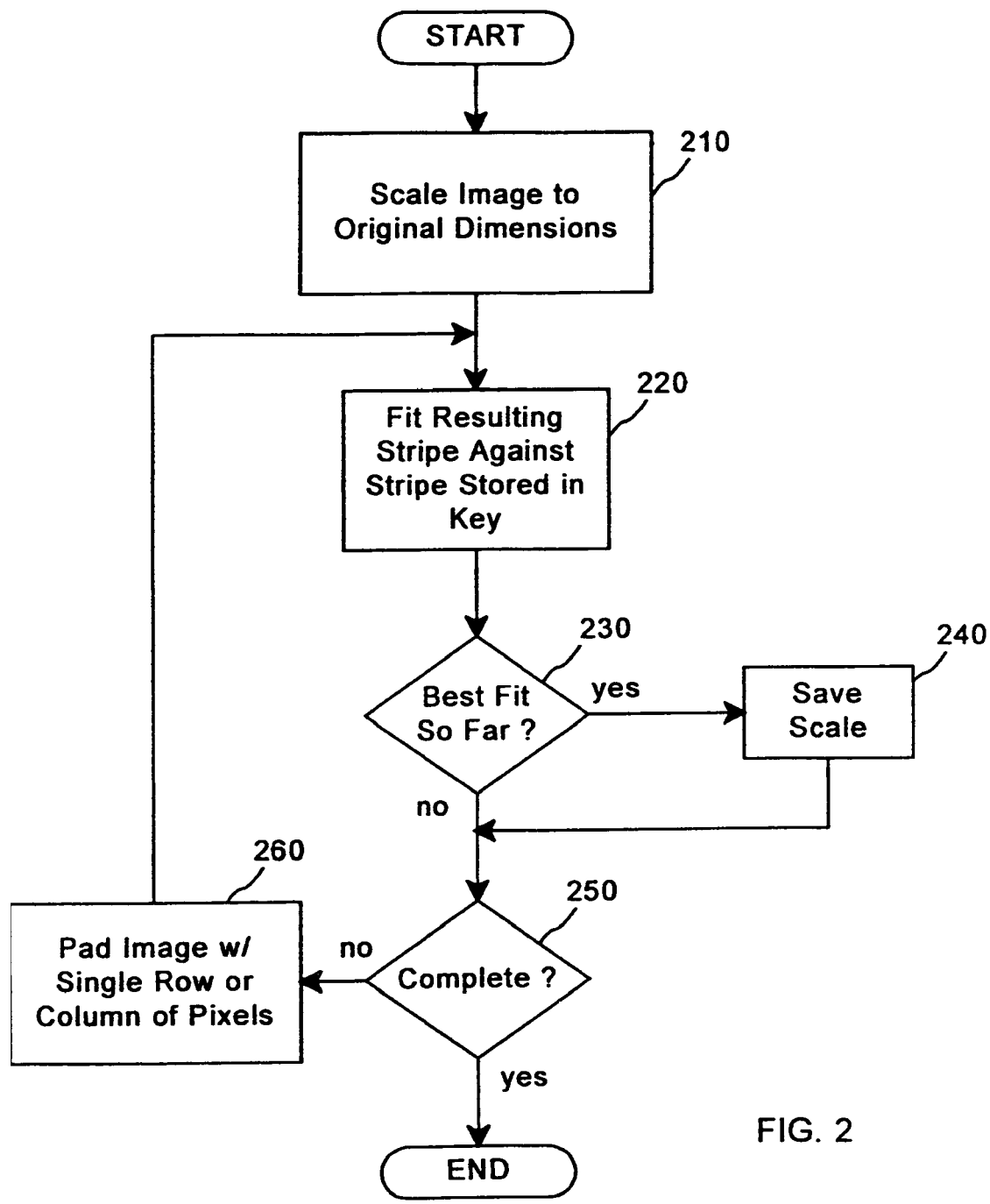
FIG. 2 is a block flow diagram of a method for descaling digital information according to an embodiment of the present invention.

FIG. 2 is a block flow diagram of a method for descaling digital information according to an embodiment of the present invention. When an image is chosen to be decoded, it first is checked to determine if it has been cropped and/or scaled. If so, the image is scaled to the original dimensions at step 210. The resulting "stripe," or diagonal line of pixels, is fit against the stripe stored in the key at step 220. If the fit is better than the previous best fit, the scale is saved at steps 230 and 240. If desired, the image can be padded with, for example, a single row or column of zero pixels at step 260 and the process can be repeated to see if the fit improves.

If a perfect fit is found at step 250, the process concludes. If no perfect fit is found, the process continues up to a crop "radius" set by the user. For example, if the crop radius is 4 the image can be padded up to 4 rows and/or 4 columns. The best fit is chosen and the image is restored to its original dimension, with any cropped area replaced by zeroes.

Figure 3:
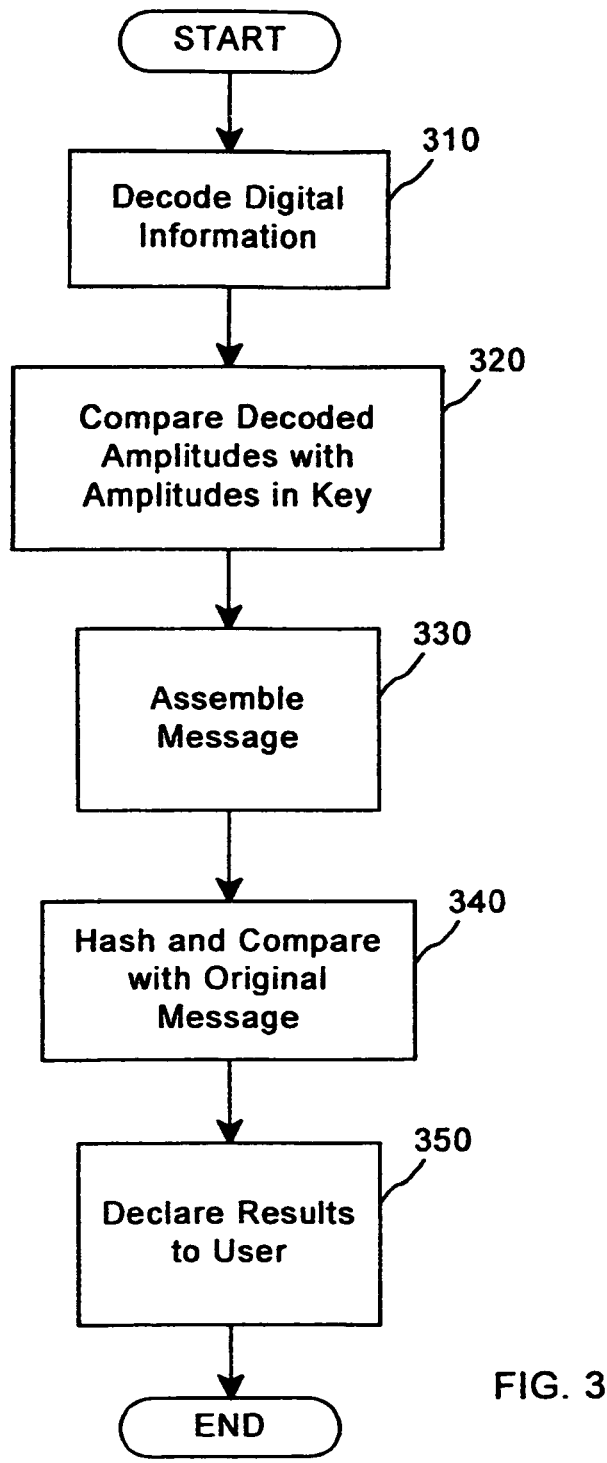
FIG. 3 is a block flow diagram of a method for decoding digital information according to an embodiment of the present invention.

Once the information has been descaled, it can be decoded according to an embodiment of the present invention shown in FIG. 3. Decoding is the inverse process of encoding. The decoded amplitudes are compared with the ones stored in the key in order to determine the position of the encoded bit at steps 310 and 320. The message is assembled using the reverse transformation table at step 330. At step 340, the message is then hashed and the hash is compared with the hash of the original message. The original hash had been stored in the key during encoding. If the hashes match, the message is declared valid and presented to the user at step 350.

Although various embodiments are specifically illustrated and described herein, it will be appreciated that modifications and variations of the present invention are covered by the above teachings and within the purview of the appended claims without departing from the spirit and intended scope of the invention. Moreover, similar operations have been applied to audio and video content for time-based manipulations of the signal as well as amplitude and pitch operations. The ability to descale or otherwise quickly determine differencing without use of the unwatermarked original is inherently important for secure digital watermarking It is also necessary to ensure nonrepudiation and third part authentication as digitized content is exchanged over networks.

The invention claimed is:

1. A method for encoding a message and scale information into digital information corresponding to an audio signal, comprising:
    (1) storing in digital memory of an encoder, digital information defining the message;
    (2) receiving in said encoder, a digital audio signal block; wherein said digital audio signal block is a digital representation of one of a set of temporally sequential segments of the audio signal;
    (3) transforming, using said encoder and a transform, said digital audio signal block into the frequency domain, thereby defining a first set of amplitudes, wherein each one of said first set of amplitudes is associated with a corresponding one of a set of sequential frequencies ranges;
    (4) identifying, using said encoder and said first set of amplitudes, an amplitude based frequency range subset of said corresponding set of sequential frequency ranges; and
    (5) encoding, using said encoder and a primary mask of a key, at least some of said amplitude based frequency range subset, by altering the amplitude associated with the corresponding frequency range;
    (6) receiving, in said encoder, a digital audio signal block, and wherein the digital audio signal block received in the encoder in step (6) corresponds to a next temporally sequential segment of the audio signal;
    (7) repeating steps (3)-(5) on the digital audio signal bloc received in the encoder in step (6), followed by repeating step (6);
    (8) repeating step (7) for the remainder of the digital audio signal blocks corresponding to the temporally sequential segments of the audio signal; and
    (9) said encoder storing, in the key, said at least some of said amplitude based frequency range subset, and corresponding amplitudes, in association with one another; and
    (10) said encoder storing, in the key, a digital representation of a sequence of the original audio signal.

2. The method of claim 1 wherein said sequence of the original audio signal comprises information defining the time duration of said sequence.

3. The method of claim 1 further comprising (11) storing the duration of said original audio signal in the key.

4. The method of claim 1 further comprising:
    a decoder descaling an audio signal by matching a portion of the audio signal to said sequence of the original signal to determine a scale associated with said audio signal, and descaling the audio signal based upon the determined scale to generate a descaled audio signal; and
    decoding the message from the descaled audio signal using the frequency ranges and corresponding amplitudes stored in the key.

5. The method of claim 1 further comprising a certification computer comprising computer memory storing the key in the computer memory; and certifying audio content by descaling and decoding based upon the sequence of the original audio signal stored in the key and the frequency ranges and corresponding amplitudes stored in the key.

6. The method of claim 1 further comprising said encoder tracking the sequential number of digital audio signal blocks it acquires by storing a window counter value in a window counter.

7. The method of claim 6 further comprising said encoder setting said window counter value to zero when said window counter value reaches a specified integer value.

8. The method of claim 1 further comprising said encoder encoding a start of message delimeter in said digital information.

9. A method for encoding a message and scale information into digital information corresponding to an image, comprising:
    (1) storing, in digital memory of an encoder, digital information defining the message;
    (2) receiving, in said encoder, a digital signal image block; wherein said digital signal image block is a digital representation of one of a set of ordered segments of the image;

(3) transforming, using said encoder and a transform, said digital signal image block into the spatial frequency domain, thereby defining a fist set of amplitudes, wherein each one of said first set of amplitudes is associated with a corresponding one of a set of ordered frequency ranges;

(4) identifying, using said encoder and said first set of amplitudes, an amplitude based frequency range subset of said corresponding set of ordered frequency ranges;

(5) encoding, using said encoder and a primary mask of a key, at least some of said amplitude based frequency range subset, by altering the amplitude associated with the corresponding frequency range;

(6) receiving, in said encoder, a digital audio signal block; wherein the digital image signal block received in the encoder in step (6) corresponds to next one of the ordered segments of the image;

(7) repeating steps (3)-(5) on the digital audio signal block received in the encoder in step (6), followed by repeating step (6);

(8) repeating step (7), for the remainder of the digital signal image blocks corresponding to the ordered segments of the image; and (9) said encoder storing, in the key, said at least some of said amplitude based frequency range subset, and corresponding amplitudes, in association with one another; and

(10) said encoder storing, in the key, a digital representation of a portion the image.

10. The method of claim 9 wherein the digital representation of the image comprises information defining the spatial dimensions of the image.

11. The method of claim 9 further comprising (11) the encoder storing in the key, at least one spatial dimension of the digital representation of the image.

12. The method of claim 9 further comprising:

a decoder descaling an image signal by matching a portion of the image signal to said digital representation of said portion of the image, to determine a scale associated with said image signal, and descaling the image signal based upon the determined scaled to generate a descaled image signal; and decoding the message from the descaled image signal using the frequency ranges and corresponding amplitudes stored in the key.

13. The method of claim 9 further comprising:

a certification computer comprising computer memory storing the key in the computer memory; and said certification computer certifying image signals by:

descaling and decoding based upon the digital representation of the portion of the image sequence stored in the key and the frequency ranges and corresponding amplitudes stored in the key; and determining whether the information decoded from the image signal corresponds to said message.

14. The method of claim 9 further comprising said encoder tracking the sequential number of digital signal image blocks it acquires by storing a window counter value in a window counter.

15. The method of claim 14 further comprising said encoder setting said window counter value to zero when said window counter value reaches a specified integer value.

16. The method of claim 9 further comprising said encoder encoding a start of message delimeter in said digital information.

* * * * *